(12) United States Patent
Zhao et al.

(10) Patent No.: US 11,505,241 B2
(45) Date of Patent: Nov. 22, 2022

(54) DRIVE-BY-WIRE ELECTRO-HYDRAULIC STEERING SYSTEM BASED ON DOUBLE-WINDING MOTOR AND HYBRID CONTROL METHOD

(71) Applicant: NANJING UNIVERSITY OF AERONAUTICS AND ASTRONAUTICS, Nanjing (CN)

(72) Inventors: Wanzhong Zhao, Nanjing (CN); Xiaochuan Zhou, Nanjing (CN); Changzhi Zhou, Nanjing (CN); Zhongkai Luan, Nanjing (CN); Weihe Liang, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 129 days.

(21) Appl. No.: 17/258,415

(22) PCT Filed: May 14, 2020

(86) PCT No.: PCT/CN2020/090298
§ 371 (c)(1),
(2) Date: Jan. 6, 2021

(87) PCT Pub. No.: WO2021/022863
PCT Pub. Date: Feb. 11, 2021

(65) Prior Publication Data
US 2022/0126910 A1    Apr. 28, 2022

(30) Foreign Application Priority Data

Jan. 13, 2020 (CN) .......................... 202010030912.9

(51) Int. Cl.
*B62D 5/04* (2006.01)
*B62D 5/00* (2006.01)
(Continued)

(52) U.S. Cl.
CPC .......... *B62D 5/0463* (2013.01); *B62D 5/003* (2013.01); *B62D 5/064* (2013.01); *B62D 5/30* (2013.01); *B62D 15/0215* (2013.01)

(58) Field of Classification Search
CPC ...... B62D 5/0463; B62D 5/003; B62D 5/064; B62D 5/30; B62D 15/0215
See application file for complete search history.

(56) References Cited

U.S. PATENT DOCUMENTS

| 7,322,439 B2 * | 1/2008 | Hara | ...................... B62D 1/163 701/41 |
| 7,469,768 B2 * | 12/2008 | Chino | .................... B62D 1/163 180/405 |

(Continued)

FOREIGN PATENT DOCUMENTS

| CN | 106515843 | 3/2017 |
| CN | 107953928 | 4/2018 |

(Continued)

*Primary Examiner* — Tony H Winner
*Assistant Examiner* — Michael R Stabley
(74) *Attorney, Agent, or Firm* — Treasure IP Group, LLC (57) ABSTRACT

The present invention discloses a drive-by-wire electro-hydraulic steering system based on a double-winding motor and a hybrid control method. The steering system includes a steering wheel (1), a steering column assembly, a road sense assembly, an electro-hydraulic power-assisted module, a double-winding motor power-assisted module (28), a steering control unit, an electromagnetic clutch (8), a steering tie rod (17), a steering trapezoid (13) and steering wheels (12). The steering system can be switched among various steering work modes according to work conditions of a vehicle, meets steering requirements under various work conditions, uses a work mode that two sets of windings of the double-winding motor work at the same time, and has a motor winding redundancy function. When one set of wind- (Continued)

ings fails, the other set of windings can drive the motor to provide power-assisted torque.

10 Claims, 3 Drawing Sheets

(51) Int. Cl.
  *B62D 5/06* (2006.01)
  *B62D 5/30* (2006.01)
  *B62D 15/02* (2006.01)

(56) References Cited

U.S. PATENT DOCUMENTS

| | | | | |
|---|---|---|---|---|
| 7,664,584 B2* | 2/2010 | Chino | .................... | B62D 6/008 |
| | | | | 180/419 |
| 7,698,035 B2* | 4/2010 | Chino | .................... | B62D 5/005 |
| | | | | 180/419 |
| 8,775,028 B2* | 7/2014 | Tashiro | .................. | B62D 5/003 |
| | | | | 180/404 |
| 9,096,254 B2* | 8/2015 | Sekiya | ................... | B62D 5/003 |
| 9,573,617 B2* | 2/2017 | Shibuya | ................ | B60W 10/20 |

FOREIGN PATENT DOCUMENTS

| | | |
|---|---|---|
| CN | 108367774 | 8/2018 |
| CN | 201710157765.X | 10/2018 |
| CN | 201811112412.9 | 1/2019 |
| CN | 109291991 | 2/2019 |
| JP | 2007161210 | 6/2007 |

\* cited by examiner

DRIVE-BY-WIRE ELECTRO-HYDRAULIC STEERING SYSTEM BASED ON DOUBLE-WINDING MOTOR AND HYBRID CONTROL METHOD

CROSS REFERENCE TO RELATED APPLICATION

This application claims priority to a PCT application PCT/CN2020/090298, filed on May 14, 2020, which in turn takes priority of Chinese Application No. 202010030912.9, filed on Jan. 13, 2020. Both the PCT application and Chinese Applications are incorporated herein by reference in their entireties.

TECHNICAL FIELD

The present invention relates to the technical field of vehicle steering systems, and more particularly relates to a drive-by-wire electro-hydraulic steering system based on a double-winding motor and a hybrid control method.

BACKGROUND ART

Most of the existing drive-by-wire steering systems are obtained through development on the basis of electric power-assisted steering. Due to the limitation of installing space and power of the vehicle-mounted power supply, the motor power is low, and the provided steering power-assisted torque is smaller, so that the existing drive-by-wire steering is mostly applied to light-weight passenger vehicles. For commercial vehicles with heavy weight and great steering power-assisted torque, the electro-hydraulic power-assisted steering is generally used as the basis of drive-by-wire steering. For example, a China invention patent with the application number of CN201710157765.X discloses an electric and drive-by-wire two-in-one hydraulic power-assisted system. The steering system uses the drive-by-wire hydraulic power under the normal condition, and uses the electro-hydraulic power when the drive-by-wire fault occurs. The problem that the electro-hydraulic power-assisted steering system cannot often work in a rotating speed range corresponding to high efficiency is solved. However, the above-mentioned electro-hydraulic power-assisted steering has the problems of great energy consumption and poor operation stability under the high-speed work condition.

By aiming at the problems, a China invention patent with the application number of CN201811112412.9 discloses a dual-power-assisted steering system integrating electro-hydraulic power-assisted torque and drive-by-wire motor power-assisted torque, so that great steering torque can be provided, and at the same time, the operation stability of the steering system under the high-speed work condition is ensured. However, in the above-mentioned dual-power-assisted steering system, a drive-by-wire motor only has one group of windings. When the drive-by-wire motor fails, the comprehensive performance of the steering system is greatly reduced, and the problem of low reliability still exists. Additionally, the drive-by-wire motor is connected with a steering column, so that motor power mechanical coupling and interference can be easily caused, and the steering precision is reduced.

SUMMARY OF THE INVENTION

In order to overcome the defects in the prior art, an objective of the present invention is to provide a drive-by-wire electro-hydraulic steering system based on a double-winding motor and a hybrid control method, so as to realize application of drive-by-wire steering to big vehicles such as commercial vehicles, improve the operation stability of big vehicles such as commercial vehicles under high-speed work conditions, reduce energy consumption of the steering system, and improve the reliability of the steering system.

In order to achieve the objective, the present invention adopts the following technical solution:

A drive-by-wire electro-hydraulic steering system based on a double-winding motor provided by the present invention includes a steering wheel, a steering column assembly, a road sense assembly, an electro-hydraulic power-assisted module, a double-winding motor power-assisted module, a steering control unit, an electromagnetic clutch, a steering tie rod, a steering trapezoid and steering wheels.

The steering wheel is connected with the steering column assembly. The steering column assembly includes a first steering column, a first torque sensor, a steering angle sensor, a second steering column, a ball screw and a displacement sensor. The first torque sensor and the steering angle sensor are respectively and fixedly arranged on the first steering column. The second steering column is connected to a screw nut of the ball screw. Two ends of a screw of the ball screw are axially and fixedly connected with a coaxial line of the steering tie rod. The displacement sensor is fixedly arranged on the ball screw. The first steering column and the second steering column are connected through the electromagnetic clutch. When the electromagnetic clutch is in a disengagement state, acting force input from the steering wheel acts on the road sense assembly through the first steering column. When the electromagnetic clutch is in an engagement state, acting force input from the steering wheel is converted into displacement of the steering tie rod through the first steering column, the electromagnetic clutch, the second steering column and the ball screw.

The road sense assembly includes a road sense motor, a second torque sensor, and a worm and gear. An output end of the road sense motor is connected with a gear end of the worm and gear through the second torque sensor. A worm end of the worm and gear is fixed onto the first steering column. Torque output from the road sense motor sequentially passes through the worm and gear and the first steering column to be transmitted to the steering wheel for forming a steering road sense.

The electro-hydraulic power-assisted module includes an oil tank, a hydraulic pump, a first motor, an electromagnetic reversing valve, a hydraulic cylinder, a piston, a piston rod, and a third torque sensor. The piston rod is positioned in the hydraulic cylinder. The piston is fixedly arranged on the piston rod. Two ends of the piston rod are axially and fixedly connected with the coaxial line of the steering tie rod. The third torque sensor is arranged at an output end of the first motor. Hydraulic oil sequentially flows to the electromagnetic reversing valve from the oil tank and the hydraulic pump under the effect of the first motor. Through different valve opening degrees of the electromagnetic reversing valve, the hydraulic oil flows to two sides of the piston inside the hydraulic cylinder to generate a pressure difference at the two sides of the piston, so that axial acting force is generated on the piston rod. The piston rod performs axial displacement movement under the effect of the axial force, and the axial displacement movement is transmitted to the steering tie rod to be converted into displacement movement of the steering tie rod.

The double-winding motor module includes a relay control unit, a double-winding motor, a first current sensor, a second current sensor and a deceleration mechanism.

The relay control unit includes a relay controller, a relay and a power supply unit. An input end of the relay controller is connected with the steering control unit. An output end of the relay controller is connected with the relay. An input end of the power supply unit is connected with the steering control unit. An output end of the power supply unit is connected with the double-winding motor through the relay to supply electricity to the double-winding motor.

The double-winding motor includes a stator iron core, a rotor assembly, a machine seat, a first set of windings, a second set of windings, and a double-winding motor output shaft.

The first set of windings includes a phase A winding, a phase B winding and a phase C winding. The second set of windings includes a phase a winding, a phase b winding and a phase c winding. An input end of the first set of windings is divided into three branches respectively connected with an input end of the phase A winding, an input end of the phase B winding and an input end of the phase C winding. An input end of the second set of windings is divided into three branches respectively connected with an input end of the phase a winding, an input end of the phase b winding and an input end of the phase c winding.

Stator slots are distributed on the stator iron core. The same phase of windings of the first set of windings and the second set of windings are staggered for an electric angle of 30° to be embedded and put in different stator slots. The stator iron core is fixed onto the machine seat. The input end of the first set of windings is connected with the first current sensor. The input end of the second set of windings is connected with the second current sensor.

The rotor assembly includes a rotor iron core and a rotor winding. The rotor winding is wound on the rotor iron core. The rotor iron core is fixed onto the double-winding motor output shaft. The first set of windings and the second set of windings work at the same time to generate a resultant magnetic field to generate an induction current in the rotor winding. The induction current drives the rotor iron core to rotate under the effect of the magnetic field. The rotor iron core outputs torque through the double-winding motor output shaft.

The deceleration mechanism includes a pinion, a belt and a gearwheel. The pinion is fixed onto the double-winding motor output shaft in the axial direction. The belt is connected with the pinion and the gearwheel. Screw threads are formed inside the gearwheel. The gearwheel is sleeved over the ball screw in the axial direction.

The steering control unit includes a main controller and other vehicle state units. An input end of the main controller is electrically connected with each sensor, and obtains a first torque signal, a second torque signal, a third torque signal, a first current signal, a second current signal, a steering angle signal, and a steering tie rod displacement signal. The other vehicle state units provide a velocity signal and a yaw rate signal of a current vehicle state for the main controller. An output end of the main controller is connected with the road sense assembly, the electromagnetic clutch, the first motor, and the relay control unit.

The electromagnetic clutch includes an armature, a driving shaft, a driven shaft, an electromagnet and a friction sheet group. The driving shaft is fixed to the first steering column in the axial direction. The driven shaft is fixed to the second steering column in the axial direction. The armature is sleeved over the driving shaft, and is able to axially move. The electromagnet is fixed onto the driving shaft. The friction sheet group is fixed onto the driven shaft. The electromagnet is positioned between the armature and the friction sheet group. An electromagnetic clutch control signal output by the main controller controls an on-off state of a coil, and further controls engagement and disengagement of the electromagnetic clutch.

Further, the electromagnetic reversing valve has three work states: a forward loading work state, a reverse loading work state and an unloading work state. During forward loading, the first motor drives an oil pump, the electromagnetic reversing valve controls opening and closing of the valve so as to make the hydraulic oil forwardly flow, the hydraulic coil flows to the two sides of the piston inside the hydraulic cylinder, and a pressure at the left side of the piston is greater than that at the right side, so that steering power is provided for the vehicle during rightward steering. During reverse loading, the first motor drives the oil pump, the electromagnetic reversing valve controls opening and closing of the valve so as to make the hydraulic oil reversely flow, the hydraulic oil flows to the two sides of the piston inside the hydraulic cylinder, and the pressure at the right side of the piston is greater than that at the left side, so that steering power is provided for the vehicle during rightward steering. During unloading, the first motor stops working, the hydraulic oil stops flowing to the two sides of the piston inside the hydraulic cylinder, and steering power is unable to be provided.

Further, the double-winding motor output shaft is arranged parallel to the steering die rod, and is connected onto the ball screw through the deceleration mechanism. Rotation movement of the double-winding motor output shaft is converted into rotation movement of the pinion. The rotation movement of the pinion is converted into rotation movement of the gearwheel through the belt. The rotation movement of the gearwheel is converted into displacement movement of the steering tie rod through the ball screw.

Further, the steering tie rod, the piston rod and the ball screw are fixedly connected into a whole, displacement of the piston rod and the ball screw is overlapped on the steering die rod, and two ends of the steering tie rod are respectively connected with the steering wheels through the steering trapezoid, so that the displacement movement of the steering tie rod is converted into steering angles of the steering wheels, and vehicle steering action is completed.

Further, the double-winding motor is a brushless direct current motor.

Further, the first current sensor and the second current sensor are Hall current sensors.

Further, the main controller includes a signal processing unit, a steering decision unit, a steering database, a hybrid control unit, a power-assisted motor driving unit, a road sense motor driving unit, an electromagnetic reversing valve driving unit and an electromagnetic clutch driving unit. The signal processing unit is electrically connected with each sensor and the other vehicle state units to obtain each sensor signal and other vehicle state signals in real time. The steering decision unit receives input signals of the signal processing unit, the steering database and the hybrid control unit through a vehicle-mounted communication line. The road sense motor driving unit, the electromagnetic reversing valve driving unit and the electromagnetic clutch driving unit receive an input signal of the steering decision unit through the vehicle-mounted communication line, and respectively output a road sense motor control signal, an electromagnetic reversing valve control signal and an electromagnetic clutch control signal. The hybrid control unit receives input signals of the signal processing unit and the steering database through the vehicle-mounted communication line. The power-assisted motor driving unit receives an input signal of the hybrid control unit through the vehicle-mounted communication line, and respectively outputs a first motor control signal and a double-winding motor control signal to complete steering action control.

Further, the hybrid control unit includes a switching supervisor, a switching controller, and a stability supervisor. The switching supervisor switches the work mode of the steering system according to an input signal of the signal processing unit, simultaneously detects a changing process of all work modes of the steering system, and reduces impact and shock caused by mode switching in the steering control process. The switching controller selects a control algorithm corresponding to each work mode of the steering system according to the work modes of the steering system recognized by the switching supervisor. The stability supervisor monitors instability characteristic quantities in each work mode and the corresponding control algorithm in real time, recognizes an instability trend, and forcibly limits an output amplitude value.

Further, the electromagnet includes the coil and a magnet yoke. The electromagnetic clutch has two work states: a disengagement work state and an engagement work state. When the coil is not electrified, the magnet yoke is separated from the armature, the friction sheet group does not transmit the torque, the electromagnetic clutch is in the disengagement state, and the torque is not transmitted between the first steering column and the second steering column. When the coil is electrified, the magnet yoke is sucked with the armature to tightly press the friction sheet group, the friction sheet group transmits the torque through friction force, the electromagnetic clutch is in the engagement state, and the torque is transmitted between the first steering column and the second steering column.

A hybrid control method of a drive-by-wire electro-hydraulic steering system based on a double-winding motor provided by the present invention is based on the system, and includes the following steps:

1) inputting a steering wheel steering angle according to a current driving work condition;

2) receiving, by the signal processing unit, the first torque signal, the second torque signal, the third torque signal, the first current signal, the second current signal, the steering angle signal, the steering tie rod displacement signal, the velocity signal and the yaw rate signal, obtaining a current vehicle state signal through calculation, and transmitting the signal to the steering decision unit and the hybrid control unit;

3) receiving, by the hybrid control unit, the input signal of the signal processing unit; obtaining, by the switching supervisor, a current velocity and a work state of each power-assisted module according to the input signal of the signal processing unit, and further switching the work mode of the steering system; selecting, by the switching controller, the control algorithm corresponding to each work mode of the steering system according to the work modes of the steering system recognized by the switching supervisor; performing calculation by the control algorithm corresponding to each work mode according to an expected front wheel steering angle in each vehicle state stored in the steering database so as to obtain expected steering tie rod displacement; transmitting the expected steering tie rod displacement to the power-assisted motor driving unit; monitoring, by the stability supervisor, the instability characteristic quantities in each work mode and the corresponding control algorithm in real time, recognizing the instability trend, and forcibly limiting the output amplitude value; transmitting, by the hybrid control unit, the current work mode of the steering system to the steering decision unit; obtaining, by the steering decision unit, the work states of the electromagnetic clutch and the electromagnetic reversing valve according to the current work mode of the steering system, and transmitting the work states to the electromagnetic clutch driving unit and the electromagnetic reversing valve driving unit; and calculating, by the steering decision unit, an expected first steering column torque corresponding to an expected driving road sense according to the expected driving road sense in each vehicle state stored in the steering database, and transmitting the expected first steering column torque to the road sense motor driving unit;

4) performing calculation by the power-assisted motor driving unit according to an output instruction of the hybrid control unit by using the expected steering tie rod displacement as a control quantity so as to obtain a first motor driving current and a double-winding motor driving current, outputting the first motor control signal and the double-winding motor control signal, and driving the first motor and the double-winding motor to work; outputting, by the electromagnetic clutch driving unit and the electromagnetic reversing valve driving unit, the electromagnetic clutch control signal and the electromagnetic reversing valve control signal according to an output instruction of the steering decision unit, and controlling the work states of the electromagnetic clutch and the electromagnetic reversing valve; and performing calculation by the road sense motor driving unit according to the output instruction of the steering decision unit by using the expected first steering column torque as a control quantity so as to obtain a road sense motor driving current, outputting the road sense motor control signal, and driving the road sense motor to work; and 5) acting the electromagnetic torque output from the road sense motor on the first steering column, transmitting the formed first steering column torque to the steering wheel to provide a driving road sense for a driver; acting the electromagnetic torque output from the double-winding motor on the ball screw through the deceleration mechanism to be converted into the steering tie rod displacement; driving the hydraulic pump to work through the electromagnetic torque output from the first motor so that the pressure difference is generated at the two sides of the piston inside the hydraulic cylinder, and the axial acting force is output and is transmitted to the steering tie rod through the piston and the piston rod to be converted into the steering tie rod displacement; and overlapping the displacement of the piston rod and the ball screw on the steering tie rod, and outputting the displacement to the steering trapezoid and the steering wheels to complete the steering action.

Further, in step 3), the steering system has four work modes: an electric power-assisted mode, an electro-hydraulic composite power-assisted mode, an electro-hydraulic power-assisted mode and a mechanical composite power-assisted mode.

Further, the control algorithm corresponding to each work mode of the steering system specifically includes:

31) in the electric power-assisted mode, the vehicle is under a high-speed work condition, and a feed-forward feedback combined control algorithm is used;

32) in the electro-hydraulic composite power-assisted mode, the vehicle is under a medium-speed work condition, and a fuzzy PID control algorithm is used;

33) in the electro-hydraulic power-assisted mode, the vehicle is under a low-speed work condition, and a PID control algorithm is used; and 34) in the mechanical composite power-assisted mode, the vehicle is under a fault work condition, and a sliding mode control algorithm is used.

Further, switching the work mode of the steering system by the switching supervisor specifically includes:

35) electric power-assisted mode: when the vehicle is under the high-speed work condition, the switching supervisor switches the work mode of the steering system into the electric power-assisted mode; and at the moment, the electromagnetic clutch is in the disengagement state, the first motor stops working, the electromagnetic reversing valve unloads, the relay contact a is connected with the contact c, the contact b is connected with the contact d, the contact a is connected with the contact e, the contact b is connected with the contact f, two sets of windings of the double-winding motor work at the same time, and the double-winding motor power-assisted module provides steering power;

36) electro-hydraulic composite power-assisted mode: when the vehicle is under the medium-speed work condition, the switching supervisor switches the work mode of the steering system into the electro-hydraulic composite power-assisted mode; and at the moment, the electromagnetic clutch is in the disengagement state, the first motor starts to work, the electromagnetic reversing valve is in a forward loading or reverse loading state, the relay contact a is connected with the contact c, the contact b is connected with the contact d, the contact a is connected with the contact e, the contact b is connected with the contact f, two sets of windings of the double-winding motor work at the same time, and the electro-hydraulic power-assisted module and the double-winding motor power-assisted module provide steering power at the same time;

37) electro-hydraulic power-assisted mode: when the vehicle is under the low-speed work condition, the switching supervisor switches the work mode of the steering system into the electro-hydraulic power-assisted mode; and at the moment, the electromagnetic clutch is in the disengagement state, each contact inside the relay is disconnected, the first motor starts to work, the electromagnetic reversing valve is in a forward loading or reverse loading state, and the electro-hydraulic power-assisted module provides steering power; and 38) mechanical composite power-assisted mode: when the vehicle is under the fault work condition, i.e., the electro-hydraulic power-assisted module or a certain set of windings of the double-winding motor fails, the switching supervisor switches the work mode of the steering system into the mechanical composite power-assisted mode; and at the moment, the electromagnetic clutch is in the engagement state, the failed module and windings stop working, the normal module and windings continuously work, and the normal module and windings provide steering power.

Further, during work mode switching of the steering system, 20 Km/h is used as a medium-low-speed switching point, 60 Km/h is used as a medium-high-speed switching point, the work condition with the velocity between 0 Km/h and 20 Km/h is the low-speed work condition, the work condition with the velocity between 20 Km/h and 60 Km/h is the medium-speed work condition, and the work condition with the velocity higher than 60 Km/h is the high-speed work condition.

The present invention has the beneficial effects:

The present invention integrates advantages of electric steering and hydraulic steering in a drive-by-wire steering system. The sufficient power-assisted torque can be output. The problems that an existing drive-by-wire steering system has low power and is difficult to be applied to big vehicles such as commercial vehicles are solved. At the same time, through electric steering, the steering precision of the steering system is improved. The problem of poor operation stability of hydraulic steering under the high-speed work condition is solved. Additionally, a drive-by-wire motor is arranged on the steering tie rod, the mechanical coupling and interference caused by electric power is reduced, and the steering precision of the steering system is further improved.

The present invention can realize switching among various steering work modes according to the current work condition of the vehicle, and meets the steering requirements under various work conditions. Through mode switching, the hydraulic power-assisted work time can be reduced, and the energy consumption of the steering system is greatly reduced. Additionally, a work mode that two sets of windings of the double-winding motor work at the same time is used, and the motor winding redundancy function is realized. When one set of windings fails, the other set of windings can drive the motor to provide the power-assisted torque. The reliability of the steering system is improved. The vehicle driving safety is enhanced.

The hybrid control method of the present invention converts a control problem of the steering system under the complicated work condition into a switching coordination problem between multi-mode control and the control algorithm to be solved. The switching supervisor and the stability supervisor of the steering control system are built. The impact and shock caused by mode switching in the steering control process are reduced. The gradual stability and global bounded stability in the work mode switching process are ensured.

In the figures, 1 denotes a steering wheel; 2 denotes a steering angle sensor; 3 denotes a first torque sensor; 4 denotes a worm and gear; 5 denotes a first steering column; 6 denotes an electromagnetic clutch; 7 denotes an electromagnetic reversing valve; 8 denotes a hydraulic pump; 9 denotes a first motor; 10 denotes a third torque sensor; 11 denotes an oil tank; 12 denotes a steering wheel; 13 denotes a steering trapezoid; 14 denotes a piston rod; 15 denotes a piston; 16 denotes a hydraulic cylinder; 17 denotes a steering tie rod; 18 denotes a second steering column; 19 denotes a screw nut; 20 denotes a ball screw; 21 denotes a displacement sensor; 22 denotes a deceleration mechanism; 23 denotes a double-winding motor output shaft; 24 denotes a first set of windings; 25 denotes a second set of windings; 26 denotes a second current sensor; 27 denotes a relay control unit; 28 denotes a double-winding motor power-assisted module; 29 denotes a first current sensor; 30 denotes other vehicle state units; 31 denotes a main controller; 32 denotes a road sense motor; 33 denotes a second torque sensor;

A denotes a rotating angle signal; B denotes a first torque signal; C denotes a second torque signal; D denotes a third torque signal; E denotes a first current signal; F denotes a second current signal; G denotes a steering tie rod displacement signal; H denotes a road sense motor control signal; I denotes a first motor control signal; J denotes an electromagnetic clutch control signal; K denotes an electromagnetic reversing valve control signal; L denotes a double-winding motor control signal; M denotes a velocity signal; and N denotes a yaw rate signal.

DETAILED DESCRIPTION OF THE INVENTION

For the purpose of facilitating the understanding of those skilled in the art, the present invention is further illustrated in conjunction with embodiments and drawings, and the description in implementations is not intended to limit the present invention.

Figure 1:
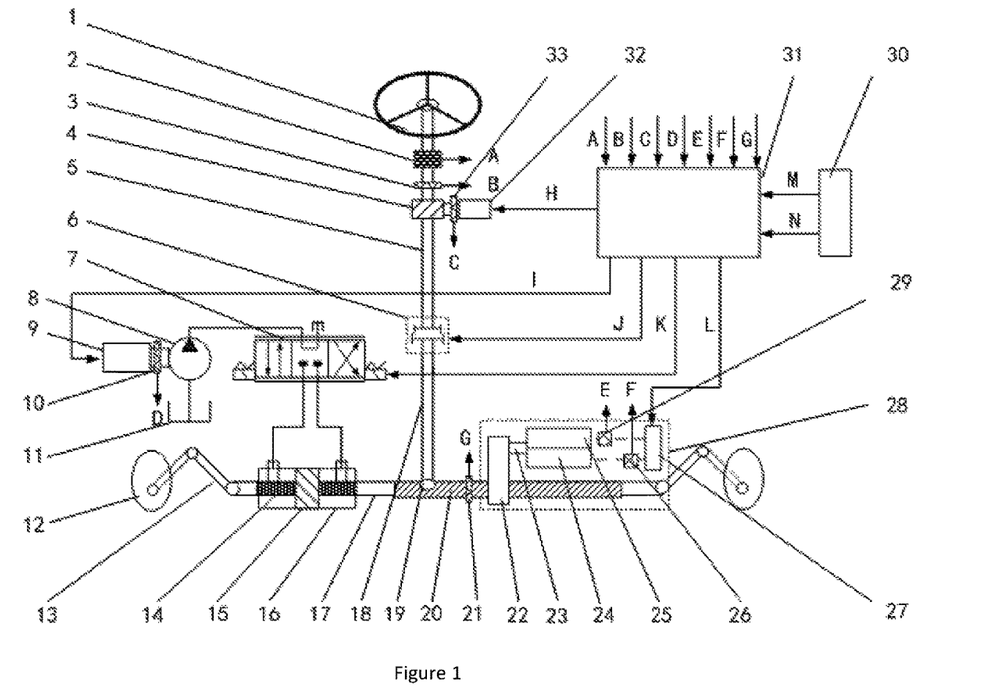
FIG. 1 is a principle structure block diagram of a drive-by-wire electro-hydraulic steering system of the present invention.
Figure 2:
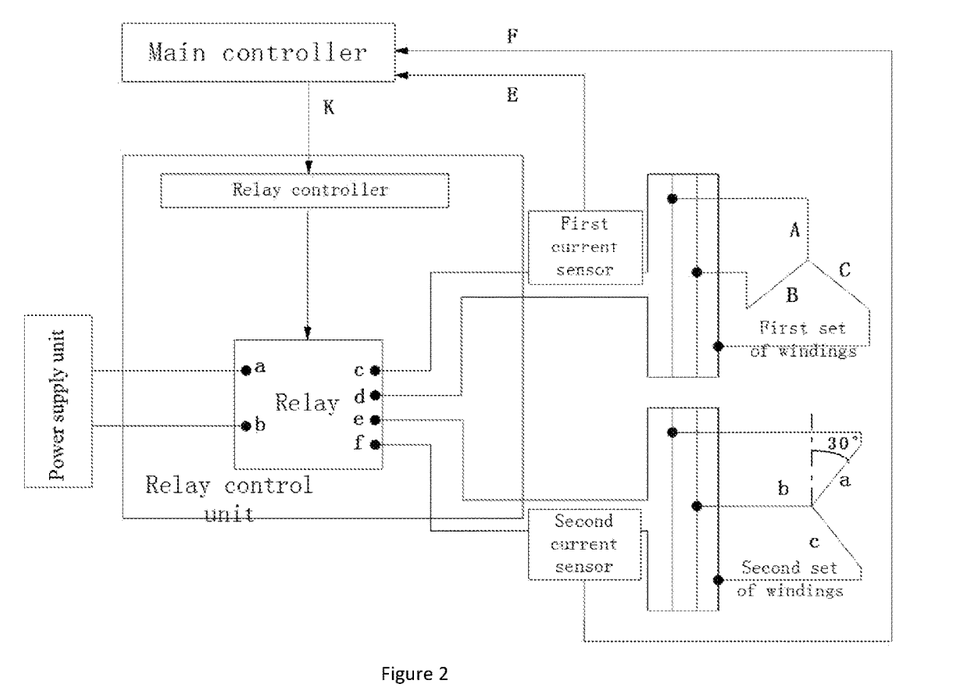
FIG. 2 is a principle structure diagram of a double-winding motor of the present invention.

As shown in FIG. 1 and FIG. 2, a drive-by-wire electro-hydraulic steering system based on a double-winding motor provided by the present invention includes a steering wheel 1, a steering column assembly, a road sense assembly, an electro-hydraulic power-assisted module, a double-winding motor power-assisted module 28, a steering control unit, an electromagnetic clutch 6, a steering tie rod 17, a steering trapezoid 13 and steering wheels 12.

The steering wheel 1 is connected with the steering column assembly. The steering column assembly includes a first steering column 5, a first torque sensor 3, a steering angle sensor 2, a second steering column 18, a ball screw 20 and a displacement sensor 21. The first torque sensor 3 and the steering angle sensor 2 are respectively and fixedly arranged on the first steering column 5. The second steering column 18 is connected to a screw nut 19 of the ball screw 20. Two ends of a screw of the ball screw 20 are axially and fixedly connected with a coaxial line of the steering tie rod 17. The displacement sensor 21 is fixedly arranged on the ball screw 20. The first steering column 5 and the second steering column 18 are connected through the electromagnetic clutch 6. When the electromagnetic clutch 6 is in a disengagement state, acting force input from the steering wheel 1 acts on the road sense assembly through the first steering column 5. When the electromagnetic clutch 6 is in an engagement state, acting force input from the steering wheel 1 is converted into displacement of the steering tie rod 17 through the first steering column 5, the electromagnetic clutch 6, the second steering column 18 and the ball screw 20.

The road sense assembly includes a road sense motor 32, a second torque sensor 33, and a worm and gear 4. An output end of the road sense motor 32 is connected with a gear end of the worm and gear 32 through the second torque sensor 33. A worm end of the worm and gear 4 is fixed onto the first steering column 5. Torque output from the road sense motor 32 sequentially passes through the worm and gear 4 and the first steering column 5 to be transmitted to the steering wheel 1 for forming a steering road sense.

The electro-hydraulic power-assisted module includes an oil tank 11, a hydraulic pump 8, a first motor 9, an electromagnetic reversing valve 7, a hydraulic cylinder 16, a piston 15, a piston rod 14, and a third torque sensor 10. The piston rod 14 is positioned in the hydraulic cylinder 16. The piston 15 is fixedly arranged on the piston rod 14. Two ends of the piston rod 14 are axially and fixedly connected with the coaxial line of the steering tie rod 17. The third torque sensor 10 is arranged at an output end of the first motor 9. Hydraulic oil sequentially flows to the electromagnetic reversing valve 7 from the oil tank 11 and the hydraulic pump 8 under the effect of the first motor 9. Through different valve opening degrees of the electromagnetic reversing valve 7, the hydraulic oil flows to two sides of the piston inside the hydraulic cylinder 16 to generate a pressure difference at the two sides of the piston 15, so that axial acting force is generated on the piston rod 14. The piston rod 14 performs axial displacement movement under the effect of the axial force, and the axial displacement movement is transmitted to the steering tie rod 17 to be converted into displacement movement of the steering tie rod.

The electromagnetic reversing valve 7 has three work states: a forward loading work state, a reverse loading work state and an unloading work state. During forward loading, the first motor 9 drives an oil pump, the electromagnetic reversing valve 7 controls opening and closing of the valve so as to make the hydraulic oil forwardly flow, the hydraulic coil flows to the two sides of the piston 15 inside the hydraulic cylinder 16, and a pressure at the left side of the piston 15 is greater than that at the right side, so that steering power is provided for the vehicle during rightward steering. During reverse loading, the first motor 9 drives the oil pump, the electromagnetic reversing valve 7 controls opening and closing of the valve so as to make the hydraulic oil reversely flow, the hydraulic oil flows to the two sides of the piston 15 inside the hydraulic cylinder 16, and the pressure at the right side of the piston 15 is greater than that at the left side, so that steering power is provided for the vehicle during rightward steering. During unloading, the first motor 9 stops working, the hydraulic oil stops flowing to the two sides of the piston 15 inside the hydraulic cylinder, and steering power is unable to be provided.

The double-winding motor module 28 includes a relay control unit 27, a double-winding motor, a first current sensor 29, a second current sensor 26 and a deceleration mechanism 22.

The relay control unit 27 includes a relay controller, a relay and a power supply unit. An input end of the relay controller is connected with the steering control unit. An output end of the relay controller is connected with the relay. An input end of the power supply unit is connected with the steering control unit. An output end of the power supply unit is connected with the double-winding motor through the relay to supply electricity to the double-winding motor.

The double-winding motor is a brushless direct current motor, and includes a stator iron core, a rotor assembly, a machine seat, a first set of windings 24, a second set of windings 25, and a double-winding motor output shaft 23.

The first set of windings 24 includes a phase A winding, a phase B winding and a phase C winding. The second set of windings 25 includes a phase a winding, a phase b winding and a phase c winding. An input end of the first set of windings 24 is divided into three branches respectively connected with an input end of the phase A winding, an input end of the phase B winding and an input end of the phase C winding. An input end of the second set of windings 25 is divided into three branches respectively connected with an input end of the phase a winding, an input end of the phase b winding and an input end of the phase c winding.

Stator slots are distributed on the stator iron core. The same phase of windings of the first set of windings 24 and the second set of windings 25 are staggered for an electric angle of 30° to be embedded and put in different stator slots. The stator iron core is fixed onto the machine seat. The input end of the first set of windings 24 is connected with the first current sensor 29. The input end of the second set of windings 25 is connected with the second current sensor 26.

The first current sensor and the second current sensor are both Hall current sensors.

The rotor assembly includes a rotor iron core and a rotor winding. The rotor winding is wound on the rotor iron core. The rotor iron core is fixed onto the double-winding motor output shaft. The first set of windings and the second set of windings work at the same time to generate a resultant magnetic field to generate an induction current in the rotor winding. The induction current drives the rotor iron core to rotate under the effect of the magnetic field. The rotor iron core outputs torque through the double-winding motor output shaft.

The deceleration mechanism 22 includes a pinion, a belt and a gearwheel. The pinion is fixed onto the double-winding motor output shaft in the axial direction. The belt is connected with the pinion and the gearwheel. Screw threads are formed inside the gearwheel. The gearwheel is sleeved over the ball screw 20 in the axial direction.

The double-winding motor output shaft 23 is arranged parallel to the steering die rod 17, and is connected onto the ball screw 20 through the deceleration mechanism 22. Rotation movement of the double-winding motor output shaft 23 is converted into rotation movement of the pinion. The rotation movement of the pinion is converted into rotation movement of the gearwheel through the belt. The rotation movement of the gearwheel is converted into displacement movement of the steering tie rod through the ball screw.

The steering tie rod 17, the piston rod 14 and the ball screw 20 are fixedly connected into a whole, displacement of the piston rod 14 and the ball screw 20 is overlapped on the steering die rod, and the two ends of the steering tie rod 17 are respectively connected with the steering wheels through the steering trapezoid, so that the displacement movement of the steering tie rod is converted into steering angles of the steering wheels, and vehicle steering action is completed.

The steering control unit includes a main controller 31 and other vehicle state units 30. An input end of the main controller 31 is electrically connected with each sensor, and obtains a first torque signal B, a second torque signal C, a third torque signal D, a first current signal E, a second current signal F, a steering angle signal A, and a steering tie rod displacement signal G. The other vehicle state units 30 provide a velocity signal M and a yaw rate signal N of a current vehicle state for the main controller. An output end of the main controller is connected with the road sense assembly, the electromagnetic clutch, the first motor, and the relay control unit.

The main controller 31 includes a signal processing unit, a steering decision unit, a steering database, a hybrid control unit, a power-assisted motor driving unit, a road sense motor driving unit, an electromagnetic reversing valve driving unit and an electromagnetic clutch driving unit. The signal processing unit is electrically connected with each sensor and the other vehicle state units to obtain each sensor signal and other vehicle state signals in real time. The steering decision unit receives input signals of the signal processing unit, the steering database and the hybrid control unit through a vehicle-mounted communication line. The road sense motor driving unit, the electromagnetic reversing valve driving unit and the electromagnetic clutch driving unit receive an input signal of the steering decision unit through the vehicle-mounted communication line, and respectively output a road sense motor control signal H, an electromagnetic reversing valve control signal K and an electromagnetic clutch control signal J. The hybrid control unit receives input signals of the signal processing unit and the steering database through the vehicle-mounted communication line. The power-assisted motor driving unit receives an input signal of the hybrid control unit through the vehicle-mounted communication line, and respectively outputs a first motor control signal I and a double-winding motor control signal L to complete steering action control.

The hybrid control unit includes a switching supervisor, a switching controller, and a stability supervisor. The switching supervisor switches the work mode of the steering system according to an input signal of the signal processing unit, simultaneously detects a changing process of all work modes of the steering system, and reduces impact and shock caused by mode switching in the steering control process. The switching controller selects a control algorithm corresponding to each work mode of the steering system according to the work modes of the steering system recognized by the switching supervisor. The stability supervisor monitors instability characteristic quantities in each work mode and the corresponding control algorithm in real time, recognizes an instability trend, and forcibly limits an output amplitude value.

The electromagnetic clutch 6 includes an armature, a driving shaft, a driven shaft, an electromagnet and a friction sheet group. The driving shaft is fixed to the first steering column in the axial direction. The driven shaft is fixed to the second steering column in the axial direction. The armature is sleeved over the driving shaft, and is able to axially move. The electromagnet is fixed onto the driving shaft. The friction sheet group is fixed onto the driven shaft. The electromagnet is positioned between the armature and the friction sheet group. An electromagnetic clutch control signal output by the main controller controls an on-off state of a coil, and further controls engagement and disengagement of the electromagnetic clutch.

The electromagnet includes the coil and a magnet yoke. The electromagnetic clutch has two work states: a disengagement work state and an engagement work state. When the coil is not electrified, the magnet yoke is separated from the armature, the friction sheet group does not transmit the torque, the electromagnetic clutch is in the disengagement state, and the torque is not transmitted between the first steering column and the second steering column. When the coil is electrified, the magnet yoke is sucked with the armature to tightly press the friction sheet group, the friction sheet group transmits the torque through friction force, the electromagnetic clutch is in the engagement state, and the torque can be transmitted between the first steering column and the second steering column.

Figure 3:
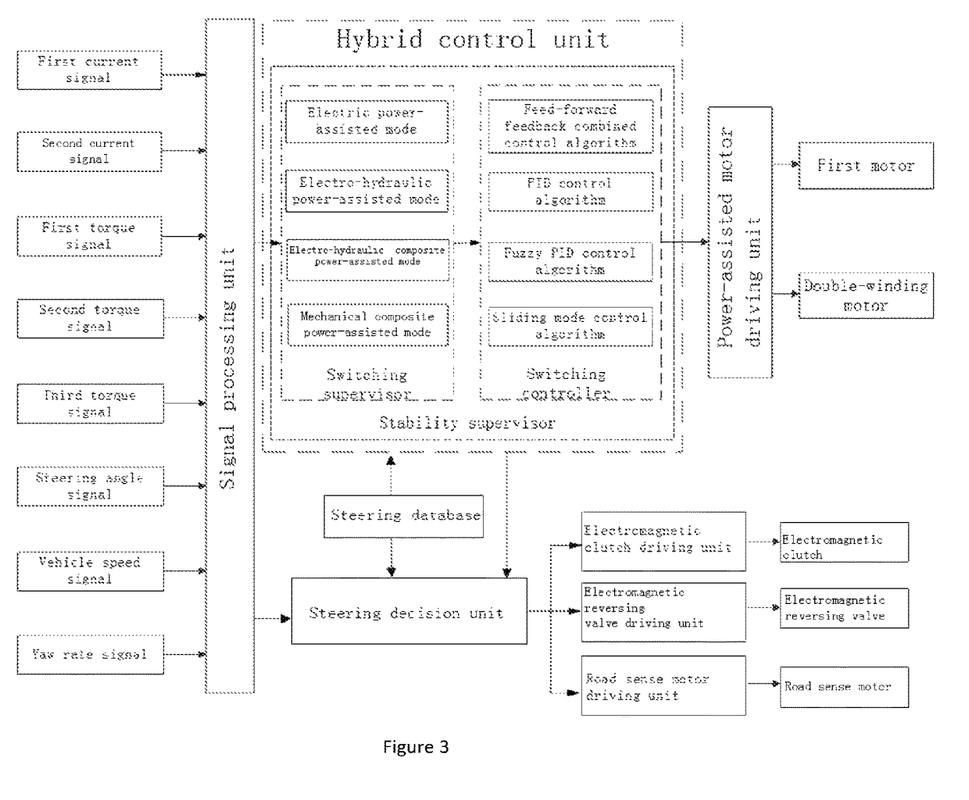
FIG. 3 is a flow diagram of a hybrid control method of the present invention.

As shown in FIG. 3, a hybrid control method of a drive-by-wire electro-hydraulic steering system based on a double-winding motor provided by the present invention is based on the system, and includes the following steps:

1) A steering wheel steering angle is input according to a current driving work condition.

2) The signal processing unit receives the first torque signal, the second torque signal, the third torque signal, the first current signal, the second current signal, the steering angle signal, the steering tie rod displacement signal, the velocity signal and the yaw rate signal, obtains a current vehicle state signal through calculation, and transmits the signal to the steering decision unit and the hybrid control unit.

3) The hybrid control unit receives the input signal of the signal processing unit. The switching supervisor obtains a current velocity and a work state of each power-assisted module according to the input signal of the signal processing unit, and further switches the work mode of the steering system. The switching controller selects the control algorithm corresponding to each work mode of the steering system according to the work modes of the steering system recognized by the switching supervisor. The control algorithm corresponding to each work mode performs calculation according to an expected front wheel steering angle in each vehicle state stored in the steering database so as to obtain expected steering tie rod displacement, and the expected steering tie rod displacement is transmitted to the power-assisted motor driving unit. The stability supervisor monitors the instability characteristic quantities in each work mode and the corresponding control algorithm in real time, recognizes the instability trend, and forcibly limits the output amplitude value. The hybrid control unit transmits the current work mode of the steering system to the steering decision unit. The steering decision unit obtains the work states of the electromagnetic clutch and the electromagnetic reversing valve according to the current work mode of the steering system, and transmits the work states to the electromagnetic clutch driving unit and the electromagnetic reversing valve driving unit. The steering decision unit calculates an expected first steering column torque corresponding to an expected driving road sense according to the expected driving road sense in each vehicle state stored in the steering database, and transmits the expected first steering column torque to the road sense motor driving unit.

Figure 4:
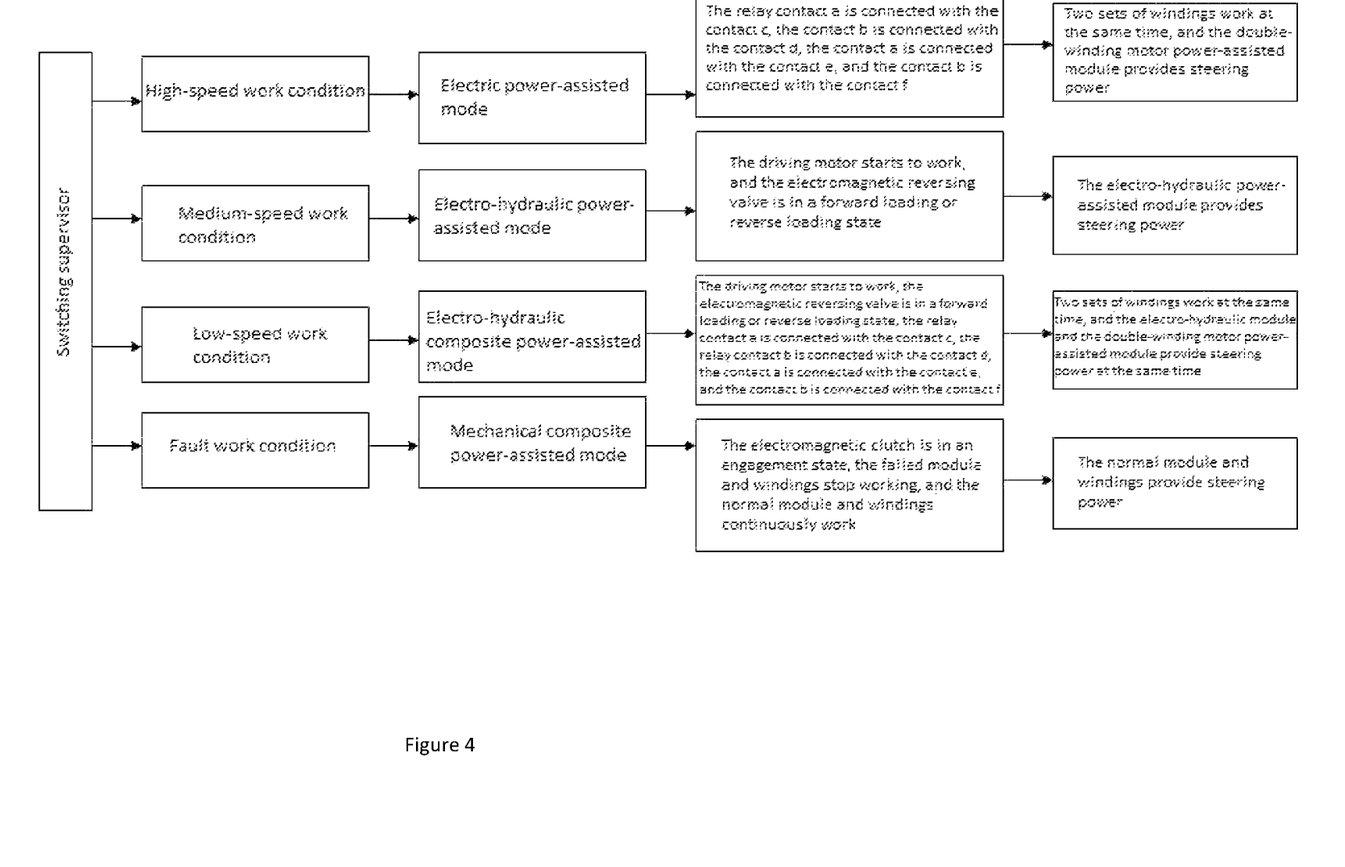
FIG. 4 is a work mode switching flow diagram of the steering system of the present invention.

As shown in FIG. 4, the steering system has four work modes: an electric power-assisted mode, an electro-hydraulic composite power-assisted mode, an electro-hydraulic power-assisted mode and a mechanical composite power-assisted mode.

The control algorithm corresponding to each work mode of the steering system specifically includes:

31) In the electric power-assisted mode, the vehicle is under a high-speed work condition, at the moment, the steering system is required to be very sensitive, and the step-input retardation time is short, so that a feed-forward feedback combined control algorithm is used.

32) In the electro-hydraulic composite power-assisted mode, the vehicle is under a medium-speed work condition, the vehicle is mostly driven in urban roads, the traffic is complicated, the requirement on the steering control precision is high, and at the same time, the steering system needs to have high self adaptability, so that a fuzzy PID control algorithm is used.

33) In the electro-hydraulic power-assisted mode, the vehicle is under a low-speed work condition, the vehicle safety is high, the PID control algorithm has the advantages of simple control, convenient application, easy parameter regulation and the like, so that a PID control algorithm is used.

34) In the mechanical composite power-assisted mode, the vehicle is under a fault work condition, the control is non-continuous, the controller needs to perform real-time change according to the current fault work condition, so that a sliding mode control algorithm is used.

Switching the work mode of the steering system by the switching supervisor specifically includes:

35) Electric power-assisted mode: When the vehicle is under the high-speed work condition, the switching supervisor switches the work mode of the steering system into the electric power-assisted mode. At the moment, the electromagnetic clutch is in the disengagement state, the first motor stops working, the electromagnetic reversing valve unloads, the relay contact a is connected with the contact c, the contact b is connected with the contact d, the contact a is connected with the contact e, the contact b is connected with the contact f, two sets of windings of the double-winding motor work at the same time, and the double-winding motor power-assisted module provides steering power.

36) Electro-hydraulic composite power-assisted mode: When the vehicle is under the medium-speed work condition, the switching supervisor switches the work mode of the steering system into the electro-hydraulic composite power-assisted mode. At the moment, the electromagnetic clutch is in the disengagement state, the first motor starts to work, the electromagnetic reversing valve is in a forward loading or reverse loading state, the relay contact a is connected with the contact c, the contact b is connected with the contact d, the contact a is connected with the contact e, the contact b is connected with the contact f, two sets of windings of the double-winding motor work at the same time, and the electro-hydraulic power-assisted module and the double-winding motor power-assisted module provide steering power at the same time.

37) Electro-hydraulic power-assisted mode: When the vehicle is under the low-speed work condition, the switching supervisor switches the work mode of the steering system into the electro-hydraulic power-assisted mode. At the moment, the electromagnetic clutch is in the disengagement state, each contact inside the relay is disconnected, the first motor starts to work, the electromagnetic reversing valve is in a forward loading or reverse loading state, and the electro-hydraulic power-assisted module provides steering power.

38) Mechanical composite power-assisted mode: When the vehicle is under the fault work condition, i.e., the electro-hydraulic power-assisted module or a certain set of windings of the double-winding motor fails, the switching supervisor switches the work mode of the steering system into the mechanical composite power-assisted mode. At the moment, the electromagnetic clutch is in the engagement state, the failed module and windings stop working, the normal module and windings continuously work, and the normal module and windings provide steering power.

4) The power-assisted motor driving unit performs calculation according to an output instruction of the hybrid control unit by using the expected steering tie rod displacement as a control quantity so as to obtain a first motor driving current and a double-winding motor driving current, outputs the first motor control signal and the double-winding motor control signal, and drives the first motor and the double-winding motor to work. The electromagnetic clutch driving unit and the electromagnetic reversing valve driving unit outputs the electromagnetic clutch control signal and the electromagnetic reversing valve control signal according to an output instruction of the steering decision unit, and controls the work states of the electromagnetic clutch and the electromagnetic reversing valve. The road sense motor driving unit performs calculation according to the output instruction of the steering decision unit by using the expected first steering column torque as a control quantity so as to obtain a road sense motor driving current, outputs the road sense motor control signal, and drives the road sense motor to work.

5) The electromagnetic torque output from the road sense motor acts on the first steering column. The formed first steering column torque is transmitted to the steering wheel to provide a driving road sense for a driver. The electromagnetic torque output from the double-winding motor acts on the ball screw through the deceleration mechanism to be converted into the steering tie rod displacement. The hydraulic pump is driven to work through the electromagnetic torque output from the first motor so that the pressure difference is generated at the two sides of the piston inside the hydraulic cylinder, and the axial acting force is output and is transmitted to the steering tie rod through the piston and the piston rod to be converted into the steering tie rod displacement. The displacement of the piston rod and the ball screw is overlapped on the steering tie rod, and is output to the steering trapezoid and the steering wheels to complete the steering action.

Additionally, during work mode switching of the steering system, 20 Km/h is used as a medium-low-speed switching point, 60 Km/h is used as a medium-high-speed switching point, the work condition with the velocity between 0 Km/h and 20 Km/h is the low-speed work condition, the work condition with the velocity between 20 Km/h and 60 Km/h is the medium-speed work condition, and the work condition with the velocity higher than 60 Km/h is the high-speed work condition.

There are numerous specific ways in which the present invention may be applied, and the foregoing is merely exemplary implementations of the present invention. It will be understood by those skilled in the art that various modification may be made without departing from the principle of the present invention, and these modifications should also fall within the protection scope of the present invention.

The invention claimed is:

1. A drive-by-wire electro-hydraulic steering system based on a double-winding motor, comprising a steering wheel, a steering column assembly, a road sense assembly, an electro-hydraulic power-assisted module, a double-winding motor power-assisted module, a steering control unit, an electromagnetic clutch, a steering tie rod, a steering trapezoid and steering wheels;

the steering wheel is connected with the steering column assembly, and the steering column assembly comprises a first steering column, a first torque sensor, a steering angle sensor, a second steering column, a ball screw and a displacement sensor; the first torque sensor and the steering angle sensor are respectively and fixedly arranged on the first steering column, the second steering column is connected to a screw nut of the ball screw, two ends of a screw of the ball screw are axially and fixedly connected with a coaxial line of the steering tie rod, the displacement sensor is fixedly arranged on the ball screw, and the first steering column and the second steering column are connected through the electromagnetic clutch; when the electromagnetic clutch is in a disengagement state, acting force input from the steering wheel acts on the road sense assembly through the first steering column; when the electromagnetic clutch is in an engagement state, acting force input from the steering wheel is converted into displacement of the steering tie rod through the first steering column, the electromagnetic clutch, the second steering column and the ball screw;

the road sense assembly comprises a road sense motor, a second torque sensor, and a worm and gear; an output end of the road sense motor is connected with a gear end of the worm and gear through the second torque sensor, and a worm end of the worm and gear is fixed onto the first steering column; torque output from the road sense motor sequentially passes through the worm and gear and the first steering column to be transmitted to the steering wheel for forming a steering road sense;

the electro-hydraulic power-assisted module comprises an oil tank, a hydraulic pump, a first motor, an electromagnetic reversing valve, a hydraulic cylinder, a piston, a piston rod, and a third torque sensor; the piston rod is positioned in the hydraulic cylinder, the piston is fixedly arranged on the piston rod, and two ends of the piston rod are axially and fixedly connected with the coaxial line of the steering tie rod; the third torque sensor is arranged at an output end of the first motor; hydraulic oil sequentially flows to the electromagnetic reversing valve from the oil tank and the hydraulic pump under the effect of the first motor, through different valve opening degrees of the electromagnetic reversing valve, the hydraulic oil flows to two sides of the piston inside the hydraulic cylinder to generate a pressure difference at the two sides of the piston, so that axial acting force is generated on the piston rod, the piston rod performs axial displacement movement under the effect of the axial force, and the axial displacement movement is transmitted to the steering tie rod to be converted into displacement movement of the steering tie rod;

the double-winding motor module comprises a relay control unit, a double-winding motor, a first current sensor, a second current sensor and a deceleration mechanism;

the relay control unit comprises a relay controller, a relay and a power supply unit; an input end of the relay controller is connected with the steering control unit, and an output end of the relay controller is connected with the relay; an input end of the power supply unit is connected with the steering control unit, and an output end of the power supply unit is connected with the double-winding motor through the relay to supply electricity to the double-winding motor;

the double-winding motor comprises a stator iron core, a rotor assembly, a machine seat, a first set of windings, a second set of windings, and a double-winding motor output shaft;

the first set of windings comprises a phase A winding, a phase B winding and a phase C winding; the second set of windings comprises a phase a winding, a phase b winding and a phase c winding; an input end of the first set of windings is divided into three branches respectively connected with an input end of the phase A winding, an input end of the phase B winding and an input end of the phase C winding; an input end of the second set of windings is divided into three branches respectively connected with an input end of the phase a winding, an input end of the phase b winding and an input end of the phase c winding;

stator slots are distributed on the stator iron core, the same phase of windings of the first set of windings and the second set of windings are staggered for an electric angle of 30° to be embedded and put in different stator slots, and the stator iron core is fixed onto the machine seat; the input end of the first set of windings is connected with the first current sensor, and the input end of the second set of windings is connected with the second current sensor;

the rotor assembly comprises a rotor iron core and a rotor winding; the rotor winding is wound on the rotor iron core, and the rotor iron core is fixed onto the double-winding motor output shaft; the first set of windings and the second set of windings work at the same time to generate a resultant magnetic field to generate an induction current in the rotor winding, the induction current drives the rotor iron core to rotate under the effect of the magnetic field, and the rotor iron core outputs torque through the double-winding motor output shaft;

the deceleration mechanism comprises a pinion, a belt and a gearwheel; the pinion is fixed onto the double-winding motor output shaft in the axial direction, the belt is connected with the pinion and the gearwheel, screw threads are formed inside the gearwheel, and the gearwheel is sleeved over the ball screw in the axial direction;

the steering control unit comprises a main controller and other vehicle state units; an input end of the main controller is electrically connected with each sensor, and obtains a first torque signal, a second torque signal, a third torque signal, a first current signal, a second current signal, a steering angle signal, and a steering tie rod displacement signal; the other vehicle state units provide a velocity signal and a yaw rate signal of a current vehicle state for the main controller; an output end of the main controller is connected with the road sense assembly, the electromagnetic clutch, the first motor, and the relay control unit; and the electromagnetic clutch comprises an armature, a driving shaft, a driven shaft, an electromagnet and a friction sheet group; the driving shaft is fixed to the first steering column in the axial direction, the driven shaft is fixed to the second steering column in the axial direction, the armature is sleeved over the driving shaft, and is able to axially move, the electromagnet is fixed onto the driving shaft, the friction sheet group is fixed onto the driven shaft, and the electromagnet is positioned between the armature and the friction sheet group; and an electromagnetic clutch control signal output by the main controller controls an on-off state of a coil, and further controls engagement and disengagement of the electromagnetic clutch.

2. The drive-by-wire electro-hydraulic steering system based on a double-winding motor according to claim 1, wherein the electromagnetic reversing valve has three work states: a forward loading work state, a reverse loading work state and an unloading work state; during forward loading, the first motor drives an oil pump, the electromagnetic reversing valve controls opening and closing of the valve so as to make the hydraulic oil forwardly flow, the hydraulic coil flows to the two sides of the piston inside the hydraulic cylinder, and a pressure at the left side of the piston is greater than that at the right side, so that steering power is provided for the vehicle during rightward steering; during reverse loading, the first motor drives the oil pump, the electromagnetic reversing valve controls opening and closing of the valve so as to make the hydraulic oil reversely flow, the hydraulic oil flows to the two sides of the piston inside the hydraulic cylinder, and the pressure at the right side of the piston is greater than that at the left side, so that steering power is provided for the vehicle during rightward steering; and during unloading, the first motor stops working, the hydraulic oil stops flowing to the two sides of the piston inside the hydraulic cylinder, and steering power is unable to be provided.

3. The drive-by-wire electro-hydraulic steering system based on a double-winding motor according to claim 1, wherein the double-winding motor output shaft is arranged parallel to the steering die rod, and is connected onto the ball screw through the deceleration mechanism; and rotation movement of the double-winding motor output shaft is converted into rotation movement of the pinion, the rotation movement of the pinion is converted into rotation movement of the gearwheel through the belt, and the rotation movement of the gearwheel is converted into the displacement movement of the steering tie rod through the ball screw.

4. The drive-by-wire electro-hydraulic steering system based on a double-winding motor according to claim 1, wherein the steering tie rod, the piston rod and the ball screw are fixedly connected into a whole, displacement of the piston rod and the ball screw is overlapped on the steering die rod, and two ends of the steering tie rod are respectively connected with the steering wheels through the steering trapezoid, so that the displacement movement of the steering tie rod is converted into steering angles of the steering wheels, and vehicle steering action is completed.

5. The drive-by-wire electro-hydraulic steering system based on a double-winding motor according to claim 1, wherein the main controller comprises a signal processing unit, a steering decision unit, a steering database, a hybrid control unit, a power-assisted motor driving unit, a road sense motor driving unit, an electromagnetic reversing valve driving unit and an electromagnetic clutch driving unit; the signal processing unit is electrically connected with each sensor and the other vehicle state units to obtain each sensor signal and other vehicle state signals in real time; the steering decision unit receives input signals of the signal processing unit, the steering database and the hybrid control unit through a vehicle-mounted communication line, the road sense motor driving unit, the electromagnetic reversing valve driving unit and the electromagnetic clutch driving unit receive an input signal of the steering decision unit through the vehicle-mounted communication line, and respectively output a road sense motor control signal, an electromagnetic reversing valve control signal and an electromagnetic clutch control signal; and the hybrid control unit receives input signals of the signal processing unit and the steering database through the vehicle-mounted communication line, and the power-assisted motor driving unit receives an input signal of the hybrid control unit through the vehicle-mounted communication line, and respectively outputs a first motor control signal and a double-winding motor control signal to complete steering action control.

6. The drive-by-wire electro-hydraulic steering system based on a double-winding motor according to claim 5, wherein the hybrid control unit comprises a switching supervisor, a switching controller, and a stability supervisor; the switching supervisor switches the work mode of the steering system according to an input signal of the signal processing unit, simultaneously detects a changing process of all work modes of the steering system, and reduces impact and shock caused by mode switching in the steering control process; the switching controller selects a control algorithm corresponding to each work mode of the steering system according to the work modes of the steering system recognized by the switching supervisor; and the stability supervisor monitors instability characteristic quantities in each work mode and the corresponding control algorithm in real time, recognizes an instability trend, and forcibly limits an output amplitude value.

7. The drive-by-wire electro-hydraulic steering system based on a double-winding motor according to claim 1, wherein the electromagnet comprises the coil and a magnet yoke; the electromagnetic clutch has two work states: a disengagement work state and an engagement work state; when the coil is not electrified, the magnet yoke is separated from the armature, the friction sheet group does not transmit the torque, the electromagnetic clutch is in the disengagement state, and the torque is not transmitted between the first steering column and the second steering column; and when the coil is electrified, the magnet yoke is sucked with the armature to tightly press the friction sheet group, the friction sheet group transmits the torque through friction force, the electromagnetic clutch is in the engagement state, and the torque is transmitted between the first steering column and the second steering column.

8. A hybrid control method of a drive-by-wire electro-hydraulic steering system based on a double-winding motor, based on the system according to claim 1, wherein the hybrid control method comprises the following steps:
   1) inputting a steering wheel steering angle according to a current driving work condition;
   2) receiving, by the signal processing unit, the first torque signal, the second torque signal, the third torque signal, the first current signal, the second current signal, the steering angle signal, the steering tie rod displacement signal, the velocity signal and the yaw rate signal, obtaining a current vehicle state signal through calculation, and transmitting the signal to the steering decision unit and the hybrid control unit;
   3) receiving, by the hybrid control unit, the input signal of the signal processing unit; obtaining, by the switching supervisor, a current velocity and a work state of each power-assisted module according to the input signal of the signal processing unit, and further switching the work mode of the steering system; selecting, by the switching controller, the control algorithm corresponding to each work mode of the steering system according to the work modes of the steering system recognized by the switching supervisor, performing calculation by the control algorithm corresponding to each work mode according to an expected front wheel steering angle in each vehicle state stored in the steering database so as to obtain expected steering tie rod displacement, and transmitting the expected steering tie rod displacement to the power-assisted motor driving unit; monitoring, by the stability supervisor, the instability characteristic quantities in each work mode and the corresponding control algorithm in real time, recognizing the instability trend, and forcibly limiting the output amplitude value; transmitting, by the hybrid control unit, the current work mode of the steering system to the steering decision unit; obtaining, by the steering decision unit, the work states of the electromagnetic clutch and the electromagnetic reversing valve according to the current work mode of the steering system, and transmitting the work states to the electromagnetic clutch driving unit and the electromagnetic reversing valve driving unit; and calculating, by the steering decision unit, an expected first steering column torque corresponding to an expected driving road sense according to the expected driving road sense in each vehicle state stored in the steering database, and transmitting the expected first steering column torque to the road sense motor driving unit;
   4) performing calculation by the power-assisted motor driving unit according to an output instruction of the hybrid control unit by using the expected steering tie rod displacement as a control quantity so as to obtain a first motor driving current and a double-winding motor driving current, outputting the first motor control signal and the double-winding motor control signal, and driving the first motor and the double-winding motor to work; outputting, by the electromagnetic clutch driving unit and the electromagnetic reversing valve driving unit, the electromagnetic clutch control signal and the electromagnetic reversing valve control signal according to an output instruction of the steering decision unit, and controlling the work states of the electromagnetic clutch and the electromagnetic reversing valve; and performing calculation by the road sense motor driving unit according to the output instruction of the steering decision unit by using the expected first steering column torque as a control quantity so as to obtain a road sense motor driving current, outputting the road sense motor control signal, and driving the road sense motor to work; and
   5) acting the electromagnetic torque output from the road sense motor on the first steering column, transmitting the formed first steering column torque to the steering wheel to provide a driving road sense for a driver; acting the electromagnetic torque output from the double-winding motor on the ball screw through the deceleration mechanism to be converted into the steering tie rod displacement; driving the hydraulic pump to work through the electromagnetic torque output from the first motor so that the pressure difference is generated at the two sides of the piston inside the hydraulic cylinder, and the axial acting force is output and is transmitted to the steering tie rod through the piston and the piston rod to be converted into the steering tie rod displacement; and overlapping the displacement of the piston rod and the ball screw on the steering tie rod, and outputting the displacement to the steering trapezoid and the steering wheels to complete the steering action.

9. The hybrid control method of a drive-by-wire electro-hydraulic steering system based on a double-winding motor according to claim 8, wherein in step 3), the steering system has four work modes: an electric power-assisted mode, an electro-hydraulic composite power-assisted mode, an electro-hydraulic power-assisted mode and a mechanical composite power-assisted mode.

10. The hybrid control method of a drive-by-wire electro-hydraulic steering system based on a double-winding motor according to claim 9, wherein the control algorithm corresponding to each work mode of the steering system specifically comprises:
   31) in the electric power-assisted mode, the vehicle is under a high-speed work condition, and a feed-forward feedback combined control algorithm is used;
   32) in the electro-hydraulic composite power-assisted mode, the vehicle is under a medium-speed work condition, and a fuzzy PID control algorithm is used;
   33) in the electro-hydraulic power-assisted mode, the vehicle is under a low-speed work condition, and a PID control algorithm is used; and
   34) in the mechanical composite power-assisted mode, the vehicle is under a fault work condition, and a sliding mode control algorithm is used.

* * * * *